US012791342B2

(12) United States Patent
Choudhary et al.

(10) Patent No.: US 12,791,342 B2
(45) Date of Patent: *Nov. 10, 2026

(54) SYSTEMS AND METHODS FOR REAL-TIME ESTIMATED TIME OF ARRIVAL IN ROUTE SELECTION AND NAVIGATION

(71) Applicant: Zum Services, Inc., Redwood City, CA (US)

(72) Inventors: Rashmi Choudhary, Tracy, CA (US); Constantine Gerasimovich, San Francisco, CA (US); Andrew Mormysh, Redwood City, CA (US); Abhishek Garg, Los Altos, CA (US)

(73) Assignee: Zum Services, Inc., Redwood City, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 18/919,120

(22) Filed: Oct. 17, 2024

(65) Prior Publication Data

US 2025/0347521 A1 Nov. 13, 2025

Related U.S. Application Data

(63) Continuation of application No. 18/660,644, filed on May 10, 2024, now Pat. No. 12,146,749.

(51) Int. Cl.
*G01C 21/34* (2006.01)
*G01C 21/36* (2006.01)

(52) U.S. Cl.
CPC ..... *G01C 21/3492* (2013.01); *G01C 21/3415* (2013.01); *G01C 21/3438* (2013.01); *G01C 21/3446* (2013.01); *G01C 21/3617* (2013.01)

(58) Field of Classification Search
CPC ............ G01C 21/3415; G01C 21/3438; G01C 21/3446; G01C 21/3492; G01C 21/3617
See application file for complete search history.

(56) References Cited

U.S. PATENT DOCUMENTS 10,429,200 B1 * 10/2019 Parameswaran ..... G08G 1/0129
12,146,749 B1 * 11/2024 Choudhary ........ G01C 21/3415
(Continued)

FOREIGN PATENT DOCUMENTS

| | | | |
|---|---|---|---|
| JP | 2019046106 | A | 3/2019 |
| JP | 6582610 | B2 | 9/2019 |
| KR | 20240056257 | A | 4/2024 |

OTHER PUBLICATIONS

U.S. Appl. No. 18/660,741 , Notice of Allowance, Mailed On Jun. 24, 2025, 21 pages.

(Continued)

*Primary Examiner* — Dale Moyer
(74) *Attorney, Agent, or Firm* — Kilpatrick Townsend & Stockton LLP

(57) ABSTRACT

A server computer receives a routing request for providing a ride service and retrieves a start location and destination from the request. The server computer identifies a plurality of routes connecting the start location and destination among historical route information collected over a period of time. The routes are traveled by one or more vehicles and reported during the period of time. The server computer identifies a selected route, including a plurality of waypoints, among the plurality of routes based on the selected route having a higher probability to be taken. The server computer multiplies an identified time duration for each waypoint with a determined adjustment factor for each time duration to determine an augmented time duration for each waypoint, determines a sum of all the augmented time durations as the estimated time for arrival, and transmits the estimated time of arrival to the user device.

20 Claims, 7 Drawing Sheets

(56) References Cited

U.S. PATENT DOCUMENTS

| | | | | |
|---|---|---|---|---|
| 2008/0234927 | A1* | 9/2008 | O'Neill | G01C 21/34 701/465 |
| 2013/0311076 | A1 | 11/2013 | Mieth et al. | |
| 2014/0129121 | A1* | 5/2014 | Fino | G01C 21/3492 701/400 |
| 2016/0091324 | A1* | 3/2016 | Horihata | G08G 1/0112 701/417 |
| 2018/0037117 | A1 | 2/2018 | Koebler et al. | |
| 2018/0113470 | A1 | 4/2018 | Iagnemma et al. | |
| 2018/0202816 | A1 | 7/2018 | Kesting et al. | |
| 2019/0063938 | A1 | 2/2019 | Fukushima et al. | |
| 2019/0226855 | A1* | 7/2019 | Fu | G01C 21/3484 |
| 2020/0050199 | A1 | 2/2020 | Park et al. | |
| 2020/0208998 | A1 | 7/2020 | Xiang et al. | |
| 2021/0088349 | A1 | 3/2021 | Li | |
| 2021/0142248 | A1 | 5/2021 | Balva | |
| 2021/0293557 | A1 | 9/2021 | Vigild et al. | |
| 2021/0293565 | A1 | 9/2021 | Reed | |
| 2022/0004199 | A1 | 1/2022 | Shoval et al. | |
| 2022/0018674 | A1 | 1/2022 | Xu et al. | |
| 2022/0163339 | A1* | 5/2022 | Lee | G08G 1/0133 |
| 2022/0252401 | A1 | 8/2022 | Lupu et al. | |
| 2022/0291005 | A1 | 9/2022 | Ye et al. | |
| 2022/0326032 | A1 | 10/2022 | Liemhetcharat | |
| 2022/0404162 | A1 | 12/2022 | Williams et al. | |

OTHER PUBLICATIONS

U.S. Appl. No. 18/660,644 , "Notice of Allowance", Jul. 17, 2024, 6 pages.

U.S. Appl. No. 18/660,644 , "Supplemental Notice of Allowability", Jul. 31, 2024, 2 pages.

U.S. Appl. No. 18/660,741 , "Non-Final Office Action", Jul. 5, 2024, 20 pages.

U.S. Appl. No. 18/660,948 , "Notice of Allowance", Aug. 2, 2024, 7 pages.

Application No. PCT/US2025/028202 , International Search Report and Written Opinion, Mailed On Sep. 10, 2025, 9 pages.

Application No. PCT/US2025/028207 , International Search Report and Written Opinion, Mailed On Sep. 15, 2025, 9 pages.

Application No. PCT/US2025/028209 , International Search Report and Written Opinion, Mailed On Sep. 11, 2025, 10 pages.

U.S. Appl. No. 18/660,741 , "Final Office Action", Oct. 23, 2024, 19 pages.

U.S. Appl. No. 18/660,741 , Non-Final Office Action, Mailed On Mar. 4, 2025, 19 pages.

U.S. Appl. No. 18/660,741 , "Applicant-Initiated Interview Summary", Aug. 7, 2025, 4 pages.

Application No. PCT/US2025/028207 , Written Opinion of the International Preliminary Examining, Mailed On Apr. 13, 2026, 7 pages.

* cited by examiner

SYSTEMS AND METHODS FOR REAL-TIME ESTIMATED TIME OF ARRIVAL IN ROUTE SELECTION AND NAVIGATION

CROSS-REFERENCES TO RELATED APPLICATIONS

This application is a continuation of U.S. patent application Ser. No. 18/660,644, entitled SYSTEMS AND METHODS FOR REAL-TIME ESTIMATED TIME OF ARRIVAL IN ROUTE SELECTION AND NAVIGATION filed May 10, 2024, the disclosure of which is incorporated herein by reference for all purposes.

TECHNICAL FIELD

The present application discloses systems and methods for routing a vehicle in a fleet of vehicles and optimizing the route to reduce application programming interface calls.

BACKGROUND

Today, massive fleets of vehicles are owned by both governmental and private institutions to facilitate the transport of goods and passengers, which is a major logistics endeavor. Fleet vehicles may have routes which are traveled on a periodic basis to serve customers in various capacities. For example, mail is delivered to virtually every home in the United States on a daily basis by mail carriers in individual trucks. Other private mail companies and goods delivery companies also have fleets of trucks to provide mail service for individual customers. Similarly, local governmental entities operate bus lines for mass transit of passengers, typically in and out of big cities. Public bus lines, for example, use main routes with spurs that serve residential areas of a city to facilitate passengers traveling into and out from the city on a daily basis. Both public and private schools operate bus lines to safely transport children to and from school on a daily basis. School buses, however, usually operate based on stopping at certain places at certain times to safely load children to attend local schools and, for that reason, travel routes that are based on where children live, generally speaking.

Logistics for these fleets are incredibly complex. One recent solution with the advent of portable electronic devices has been turn-by-turn navigation and routing for drivers of various vehicles. These routes are typically selected by a server computer based on the start location for the ride, the destination of the ride, and the fastest route between those locations. A server computer may calculate a distance over a certain combination of roads and relative speed limits of those roads to determine the shortest path in terms of time between two different locations. However, drivers rarely follow these paths exactly, which frequently causes several re-routing conditions to be created. Each time a driver fails to follow a routing suggestion, the server computer must recalculate the most ideal route for the driver to follow based on where the driver left the suggested route and the intended destination for the driver. These re-routing requests are referred to as “calls” to an “API” or “application programming interface” in the server computer which, in simple explanation, is a request for the server computer to re-calculate the best route based on the changes the driver has made to the route in real time. However, these routing requests can require significant processing power and cost to the provider of the server computer each time a new route is requested. Therefore, an ideal route is one that a driver is likely to follow and that reduces the number of API calls (e.g., re-routing requests) that are received by the server computer.

It is, therefore, one object of this disclosure to provide a system which optimizes routes for a vehicle. It is another object of this disclosure to provide a routing system which optimizes routing based on a probability that a driver will follow a particular route. It is a further object of this disclosure to provide a method for optimizing routes to minimize re-routing requests.

SUMMARY

Various embodiments provide a system that includes a server computer comprising a processor and a memory storing instructions that, when executed by the processor, cause the processor to perform steps comprising: receiving, from a user device, a routing request for providing a ride service by a vehicle; retrieving a start location and a destination from the routing request; and identifying a plurality of routes connecting the start location and the destination among historical route information collected over a period of time from one or more vehicles. The plurality of routes are traveled by the one or more vehicles and reported to the server computer during the period of time to get from the start location to the destination. The steps further comprise: identifying a selected route among the plurality of routes based on the selected route having a higher probability to be taken than remaining routes in the plurality of routes, wherein the selected route includes a plurality of waypoints; and determining an estimated time for arrival. Determining the estimated time for arrival comprising: identifying a time duration for each waypoint; determining an adjustment factor for each time duration; multiplying the time duration by the adjustment factor associated with each waypoint to determine an augmented time duration for each waypoint; and determining a sum of all the augmented time durations as the estimated time for arrival. Furthermore, the steps comprise: transmitting the estimated time of arrival to the user device.

In various embodiments, the adjustment factor is based on at least one of a time of day for servicing the routing request, the day for servicing the routing request, a road condition along the selected route, traffic data, weather data, or local events data.

In various embodiments, the steps for calculating the probability for each route further comprises: for each waypoint along the route, determining a ratio of datapoints in the historical route information where the waypoint was connected to a subsequent waypoint along the route by a total count of all available datapoints where the waypoint was connected to a subsequent waypoint along all routes incorporating the waypoint.

In various embodiments, the adjustment factor is determined based on the historical route information to add or subtract from the time duration for each waypoint.

In various embodiments, the time duration is a baseline time duration which is obtained from the historical route information.

In various embodiments, the instructions, when executed by the processor, cause the processor to perform steps further comprising: receiving a routing update from the vehicle, wherein the routing update includes a new waypoint that was not a part of the selected route; updating a route selection algorithm based on the routing update; and determining a new estimated time of arrival based on the waypoints identified in the routing update.

In various embodiments, the instructions, when executed by the processor, cause the processor to perform steps further comprising: training a machine learning algorithm based on the plurality of routes followed by one or more vehicles assigned to travel between the starting location and the destination in one or more past instances; and implementing the machine learning algorithm to identify the selected route among the plurality of routes for a current instance to travel between the starting location and the destination.

In various embodiments, each route is formed of a plurality of waypoints. The instructions, when executed by the processor, cause the processor to perform steps further comprising: calculating a probability for each route among the plurality of routes, wherein the probability represents a likelihood that the route will be followed by the vehicle based on the historical route information, calculating the probability for each route further comprising: calculating a probability at each waypoint and aggregating probabilities of the plurality of waypoints forming the route; and selecting the route with highest probability as the selected route.

In various embodiments, calculating the probability for each route further comprises: for each waypoint along the route, determining a ratio of datapoints in the historical route information where the waypoint was connected to a subsequent waypoint along the route by a total count of all available datapoints where the waypoint was connected to a subsequent waypoint along all routes incorporating the waypoint.

In various embodiments, identifying the time duration at the waypoint associated with the starting location is adjusted in view of an embarkation data determined based on historical route information to account for time spent on a passenger boarding vehicle; and identifying the time duration at the waypoint associated with the destination is adjusted in view of a disembarkation data determined based on historical route information to account for time spent on one or more passengers exiting the vehicle.

Various embodiments provide a method comprising: receiving, by a server computer from a user device, a routing request for providing a ride service by a vehicle; retrieving, by the server computer, a start location and a destination from the routing request; and identifying, by the server computer, a plurality of routes connecting the start location and the destination among historical route information collected over a period of time from one or more vehicles. The plurality of routes are traveled by the one or more vehicles and reported to the server computer during the period of time to get from the start location to the destination. The steps further comprise: identifying, by the server computer, a selected route among the plurality of routes based on the selected route having a higher probability to be taken than remaining routes in the plurality of routes, wherein the selected route includes a plurality of waypoints; and determining, by the server computer, an estimated time for arrival. Determining the estimated time for arrival comprising: identifying a time duration for each waypoint; determining an adjustment factor for each time duration; multiplying the time duration by the adjustment factor associated with each waypoint to determine an augmented time duration for each waypoint; and determining a sum of all the augmented time durations as the estimated time for arrival. Furthermore, the steps comprise: transmitting the estimated time of arrival to the user device.

Various embodiments provide a non-transitory computer-readable medium storing instructions that, when executed on a server computer, cause the server computer to perform steps including: receiving, from a user device, a routing request for providing a ride service by a vehicle; retrieving a start location and a destination from the routing request; and identifying a plurality of routes connecting the start location and the destination among historical route information collected over a period of time from one or more vehicles. The plurality of routes are traveled by the one or more vehicles and reported to the server computer during the period of time to get from the start location to the destination. The steps further comprise: identifying a selected route among the plurality of routes based on the selected route having a higher probability to be taken than remaining routes in the plurality of routes, wherein the selected route includes a plurality of waypoints; and determining an estimated time for arrival. Determining the estimated time for arrival comprising: identifying a time duration for each waypoint; determining an adjustment factor for each time duration; multiplying the time duration by the adjustment factor associated with each waypoint to determine an augmented time duration for each waypoint; and determining a sum of all the augmented time durations as the estimated time for arrival. Furthermore, the steps comprise: transmitting the estimated time of arrival to the user device.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

The disclosure extends to vehicles of all types which may be assembled into a fleet for a common purpose or goal such as, but not limited to, delivering passengers, delivering goods, or any other purpose.

In the following description of the disclosure, reference is made to the accompanying drawings, which form a part hereof, and in which is shown by way of illustration specific implementations in which the disclosure may be practiced. It is understood that other implementations may be utilized, and structural changes may be made without departing from the scope of the disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Various embodiments are described herein by using the illustrative use case of generating vehicle routing suggestions to provide optimal (e.g., selected) bus routes to a bus driver picking up and dropping off children between a start location and a destination (e.g., a school). Although the vehicle routing system can provide routing suggestions to bus drivers, the embodiments of the present disclosure are not limited to use by bus drivers and/or routing buses nor are the embodiments limited to the transport of children. In particular, the vehicle routing system may be implemented by any suitable vehicle and/or fleet of vehicles. Moreover, the vehicle routing system may be implemented for the purpose of transporting passengers, goods, or any other suitable cargo. For example, the vehicle routing system may be employed by a fleet of delivery vehicles for transporting and delivering packages to customers.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
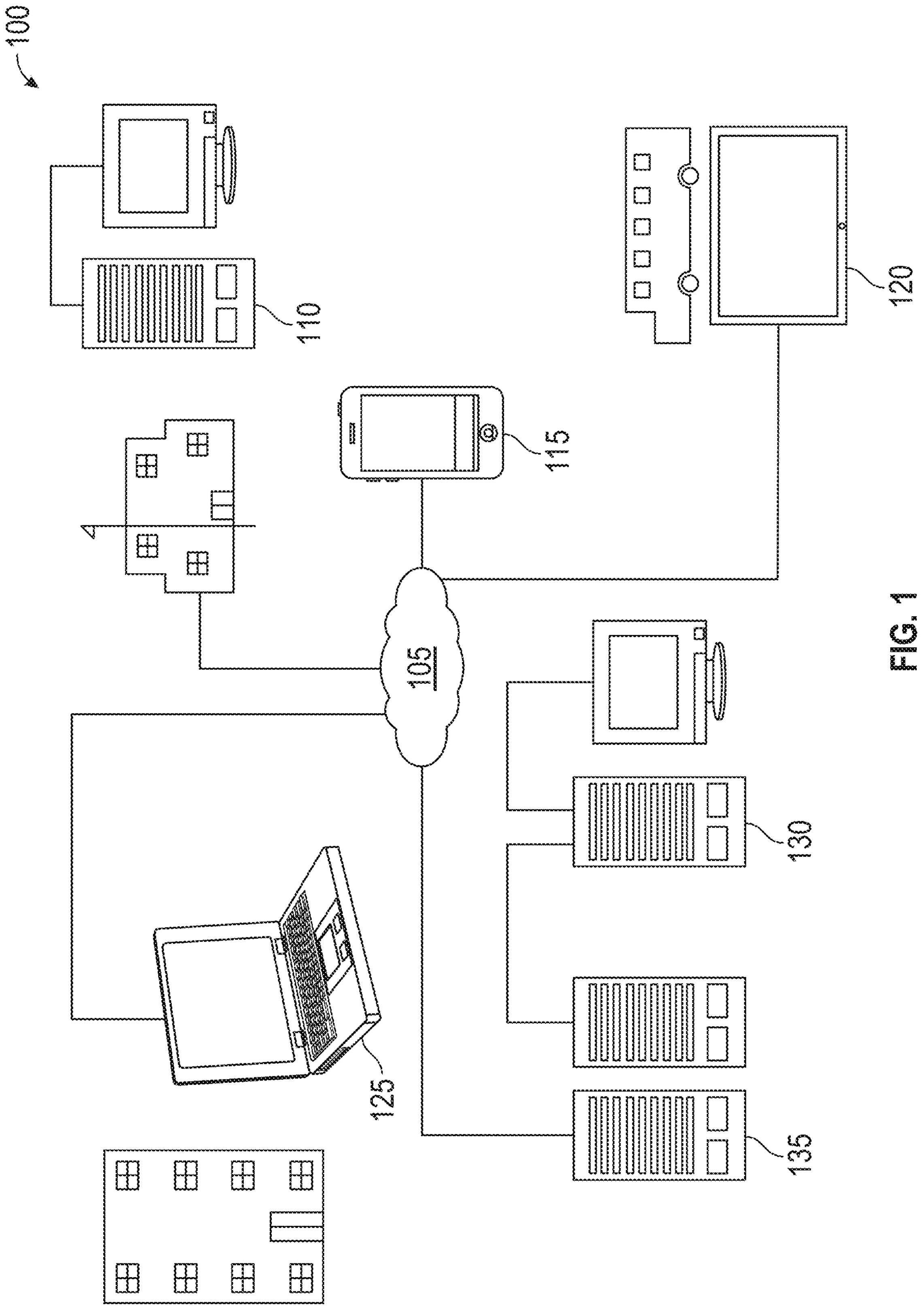
FIG. 1 illustrates box diagram of a vehicle routing system, according to various embodiments.

FIG. 1 illustrates a box diagram of a vehicle routing system 100, according to various embodiments. As illustrated, the vehicle routing system 100 may include a communications network 105, a server computer 135, and various devices (e.g., a mobile phone, tablet device, computer, etc.) such as a ride requester device 110, a user device 115, a driver device 120, an administrator device 125, a provider device 130, etc. The vehicle routing system 100 may be used in conjunction with one or more vehicles of similar and/or varying types. For example, as described herein, one or more school buses in a fleet of school buses may implement the vehicle routing system 100.

Turning to the components of the vehicle routing system 100 in further detail. In some embodiments, a server computer 135 may be used to perform various operations of the vehicle routing system 100. For example, a server computer 135 may implement a route selection algorithm (e.g., a machine learning algorithm) to provide current and future selected routes to users. The server computer 135 may be implemented as one or more actual devices but is collectively referred to herein as a server computer 135. The server computer 135 may include one or more processors and one or more memory (e.g., one or more non-transitory computer-readable medium) storing instructions that, upon execution by the one or more processors, may cause the one or more processors to perform the operations described herein. In some embodiments, the server computer 135 may provide web-based access to the vehicle routing system 100 (or relevant portions of the vehicle routing system 100) based on which device 110, 115, 120, 125, 130 is associated with a particular function—e.g., a parent using a user device 115 may not have permissions to reroute buses. The server computer 135 may include cloud computers, super computers, mainframe computers, application servers, catalog servers, communications servers, computing servers, database servers, file servers, game servers, home servers, proxy servers, stand-alone servers, web servers, combinations of one or more of the foregoing examples, and/or any other computing device that may be suitable to execute optimized routing and communication for a web-based vehicle routing system 100. The server computer 135 may include software and hardware modules, sequences of instructions, routines, data structures, display interfaces, and other types of structures that execute server computer operations. Further, hardware components of the server computer 135 may include a combination of Central Processing Units ("CPUs"), buses, volatile and non-volatile memory devices, storage units, non-transitory computer-readable medium/storage media, data processors, processing devices, processors, control devices transmitters, receivers, antennas, transceivers, input devices, output devices, network interface devices, and other types of components that are apparent to those skilled in the art. These hardware components within the server computer 135 may be used to execute the various methods or algorithms, such as a route selection algorithm, disclosed herein.

In some embodiments, the server computer 135 may interface with one or more devices 110, 115, 120, 125, 130 via a communications network 105, such as the Internet. The communications network 105 may be communicatively coupled to the server computer 135, as well as the one or more devices 110, 115, 120, 125, 130 to facilitates the access, storing, and/or exchange of information. The communications network 105 may be a wired, wireless, or both and may include one or more of any suitable communications path, such as a mobile network, a cable or fiber optics network, a WAN or LAN network, the Internet, or any other suitable means to facilitate communications in the vehicle routing system 100. Examples of these various internet connections include implementations using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11 g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network and its successors, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between the devices 110, 115, 120, 125, 130 and server computer 135.

In some embodiments, the vehicle routing system 100 may be implemented between a ride requester device 110, such as a school device, administrator device 125, or a user device 115, and a driver device 120. The various devices 110, 115, 120, 125, 130 described herein may be implemented by any suitable electronic device with processing power sufficient to share electronic information back and forth via the communications network 105. Example devices 110, 115, 120, 125, 130 include mobile phones, desktop computers, laptop computers, tablets, game consoles, personal computers, mobile devices, notebook computers, smart watches, and any other digital device that has suitable processing ability to interact with the server computer 135.

The ride requester device 110 may be implemented to select, schedule, and/or update routing. For example, a ride requester device 110 may be used to select one or more bus routes for a particular school via a Graphical User Interface (GUI). In an embodiment, the ride requester device 110 may be a user device 115, a school and/or administrator device 125, or other suitable device capable of receiving input of and transmitting a routing request. Input received by the ride requester device 110 may be associated with the generation and transmission of a routing request for providing a ride service by one or more vehicles. For example, a parent of a student may use a user device 115 to request a ride service for their child, such as a bus pick up and/or drop off. Moreover, the ride requester device 110 may receive updated information related to a route, request, vehicle, user, etc. For example, the administrator device 125 may receive updated information associated with a requested ride service, such as an updated suggested route or a new waypoint associated with a future selected route, the status of the service, information concerning the vehicle performing the service, etc. This updated information may then be presented to a user of the ride requester device 110 via the GUI.

In an embodiments, a driver device 120 may be implemented in the vehicle routing system 100. The driver device 120 may be associated with a particular user or a particular vehicle. For example, a driver device 120 may be associated with a bus driver. The driver device 120 may further be a device which couples to a vehicle, such as via an Onboard Diagnostics II (OBD II) port. In an embodiment, the driver device 120 may be configured to interface with information associated with the vehicle, such as the vehicle's engine, operating systems, location, etc. For example, a driver device 120 may be coupled to a bus via an OBD II port and may collect, store, and/or transmit information associated to the coupled bus.

In an embodiment, one or more devices 110, 115, 120, 125, 130 may be provided with varying levels of authorization to access to the vehicle routing system 100 by use of server computers 135 and/or a provider device 130. For example, a school district may use one or more administrator devices 125, which may be authorized to select, schedule, and/or update information associated with buses picking up and delivering children to a school. Alternatively, a user device 115 may only be authorized to select, schedule, and/or update information associated with one bus picking up and delivering one child associated with the user device 115. By providing the devices 110, 115, 120, 125, 130 with varying levels of authorization, various types of users with various levels of administration authorization may access and implement the vehicle routing system 100 according to their particular needs. For example, a provider device 130 may give a ride requester device 110 or an administrator device 125 access to the vehicle routing system 100 via the server computer 135 to create bus routing for a particular school district, school, bus, and/or user as appropriate.

In some embodiments, server computer 135 may provide via a GUI a user interface for one or more of the devices 110, 115, 120, 125, 130. The user interface may be utilized to create, adjust, update, and/or present routes for particular individuals. For example, routes may be generated for each child in a particular school district or school as appropriate and displayed on a ride requester device 110 via the GUI.

As described herein, the components of the vehicle routing system 100 may be utilized to generate and transmit vehicle routing suggestions. For example, information associated with a ride requester device 110 (e.g., information associated with a child that requires pick up etc.), information associated with a driver device (e.g., information associated with a vehicle, a driver, etc.), and historical data (e.g., data associated with past routes taken by various vehicles and/or riders, etc.) may be used by the vehicle routing system 100 to determine a probability that a particular driver will follow a suggested route. By utilizing the vehicle routing system 100 in this manner, more efficient and accurate turn-by-turn navigation (e.g., routing navigation information) may be provided to a vehicle. Specifically, when a driver follows a suggested route/selected route, not only is the number of communications between the driver device 120 and the server computer 135 reduced, but the number of requests for a new route based on route deviation is reduced, which, in turn, reduces the overall processing power necessary to supply turn-by-turn navigation to each vehicle in a fleet of vehicles. Moreover, arrival time to the destination may be calculated in a more accurate manner. That is, if there are no or minimal changes to the suggested route, the trip duration can be calculated accurately based on up-to-date (e.g., real time) information about traffic, weather, road conditions etc. on the known (e.g., recommended) route. As a result, the vehicle routing system 100 may provide increased energy and cost savings.

In some embodiments, elements of the historical data may be associated with a weight that indicates how old the historical data element is. When the system determines the probability that a particular driver will follow a suggested route, the system may take into consideration the age of the historical data. For example, the historical data element may be weighed by (e.g., multiplied with) the weight associated with the data. This way, newer data may be prioritized and older data may be de-prioritized. For example, a driver may have preferred a first route because there is a road closure along a second route. This preference is likely to be valid for a period of time (e.g., 1-7 days) but unlikely to be valid after the period of time (e.g., road closure is unlikely to last more than a week). Accordingly, data associated with relatively large weights (e.g., recent data) may have more influence in the analysis than the data that have smaller weights (e.g., older data).

Figure 2:
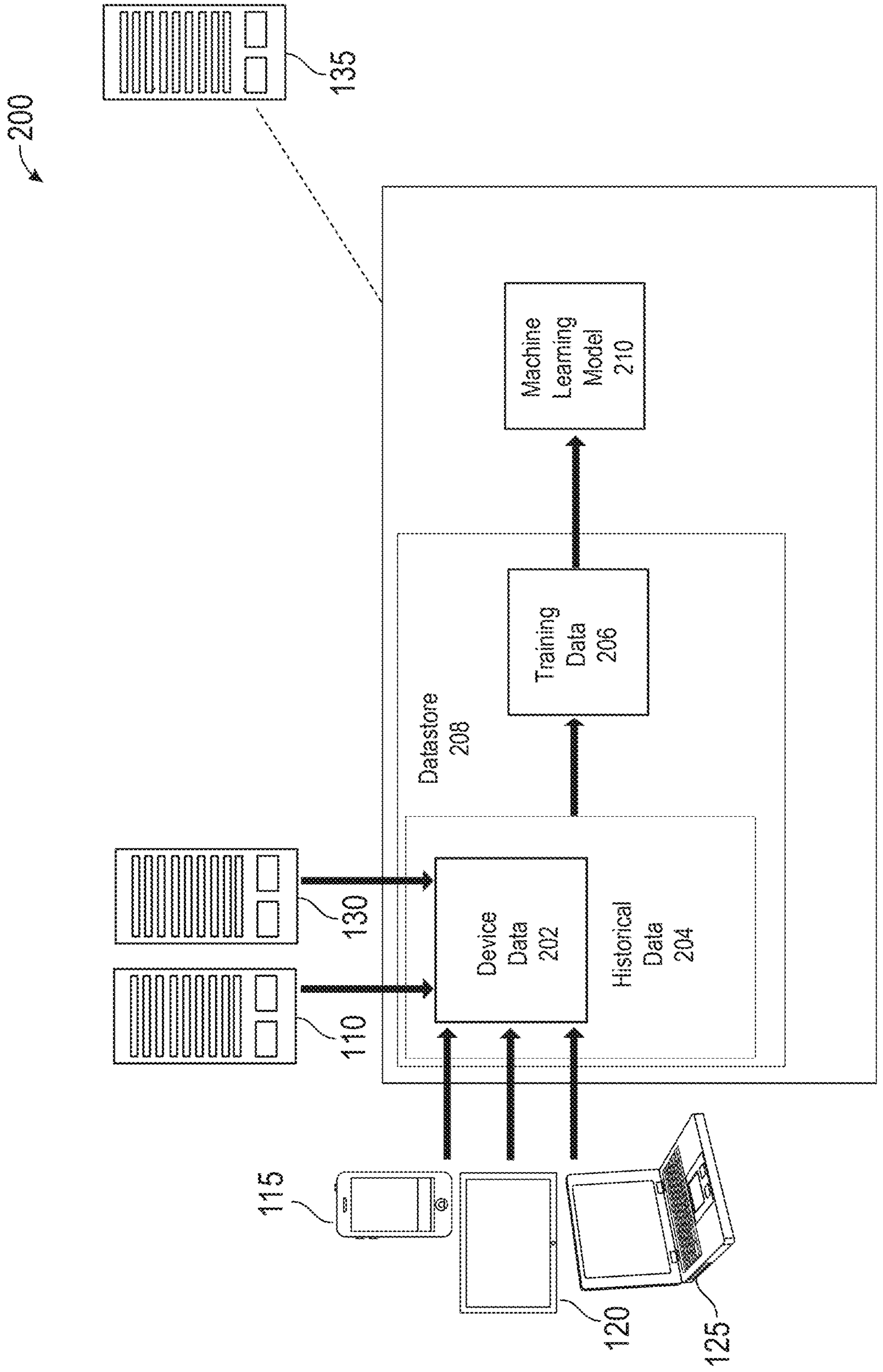
FIG. 2 illustrates a diagram of an exemplary machine learning process utilizing data to provide vehicle routing suggestions, according to various embodiments.
Figure 3:
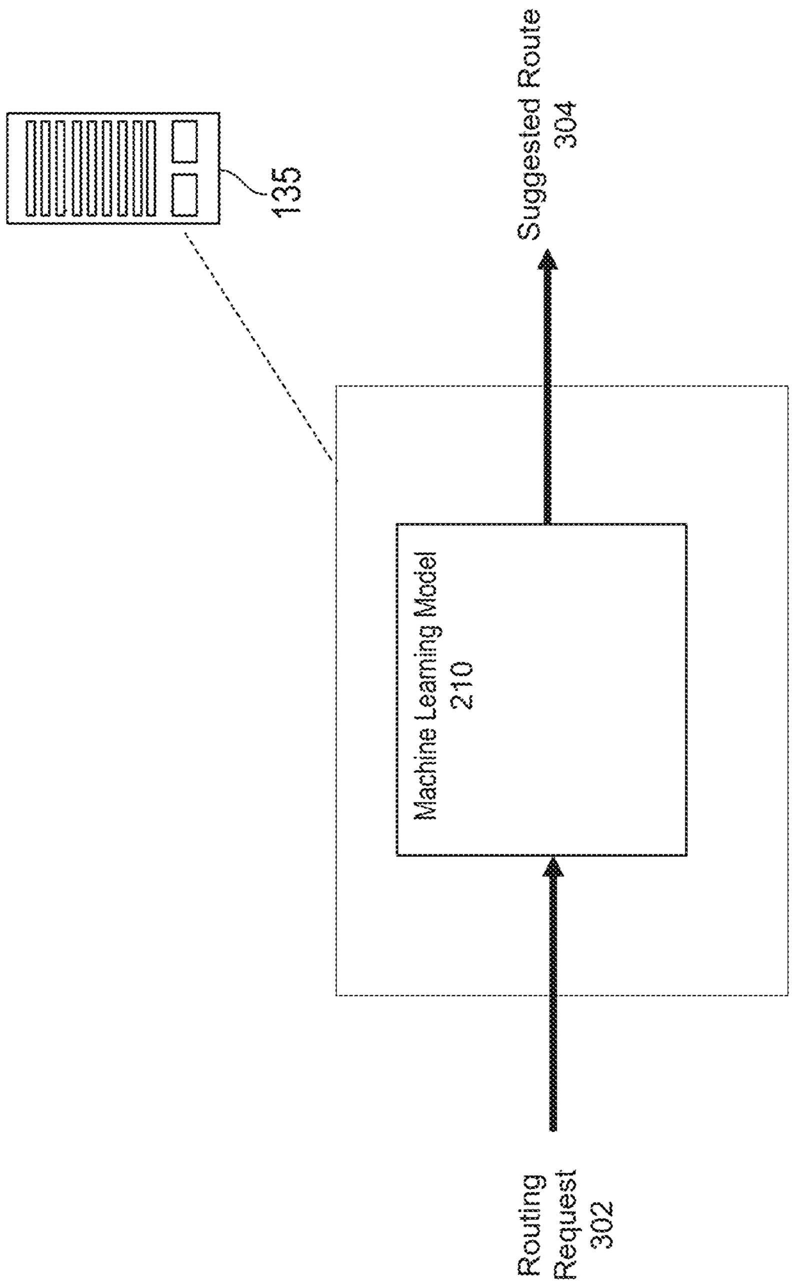
FIG. 3 illustrates an exemplary machine learning model for optimizing vehicle routing suggestion, according to various embodiments.

FIG. 2 illustrates a diagram of an exemplary machine learning process 200 utilizing data 202, 204 to provide vehicle routing suggestions, according to various embodiments. In an example, training data 206, which may include device data 202 and historical data 204, may be collected and/or stored in a datastore 208 accessible by the server computer 135. In turn, the training data 206 may be used to train a machine learning model 210 and/or a route selection algorithm (e.g., machine learning algorithm) to output suggested routes 304, as illustrated in FIG. 3. By using machine learning and artificial intelligence techniques, differences may be identified between a suggested route 304 for a past instance and the route actually taken in the past instance by a single driver, a plurality of drivers, or a fleet of drivers. For example, frequently, drivers may have a route that they favor or, while traveling along a route, may adjust a route based on traffic conditions or for other reasons. Over a certain number of trips, the server computer 135 may implement a machine learning model 210 to train a route selection algorithm to determine, for a given start location and a given destination, which routes between a given start location and a given destination are most likely to be followed by a driver in a current instance of travel based on which routes have been previously traveled in past instances of travel by that driver, a plurality of drivers, or a fleet of drivers. It should be noted that while the system and methods are described herein as utilizing a machine learning model 210, any suitable machine learning and/or artificial intelligence technique may be used. For example, a machine learning process implementing a neural network as opposed to an alternative machine learning algorithm or route selection algorithm may be implemented to output suggested routes 304 for current instances and/or future instances of travel by a vehicle.

In an embodiment, the training data 206 may include historical data 204 and/or device data 202. The historical data 204 and/or device data 202 may be collected by various devices 110, 115, 120, 125, 130 associated with the vehicle routing system 100. For example, device data 202 related to the driving history of a particular bus or driver may be collected by the driver device 120 and transmitted to the server computer 135 for storage. In an embodiment, each device 110, 115, 120, 125, 130 may be configured to detect particular information associated with the device and/or the user of the device and transmit the information as data 202, 204 to the server computer 135 via the communications network 105. For example, the driver device 120 may detect information from a particular bus ride and transmit the information as device data 202 to the server computer 135. Data transmitted by the driver device 120 to the server computer 135 may include distance traveled information, fuel use information, pickup duration information, bus stop location information (e.g., information about where the stop is designated versus where the stop actually occurred), speed of travel information (in terms of actual speeding and in terms of slowdowns caused by traffic, construction, or any other road condition), rider verification information, rider disembarking information, vehicle arrival times, and any other information that may be used by the server computer 135 to optimize routing. In some embodiments, the device data 202 may include data associated with a particular user of a device 110, 115, 120, 125, 130. For example, a user of a ride requester device 110 (e.g., a user device 115) may employ the ride requester device 110 to create a user profile. In response, data associated with said user profile may be stored in non-volatile non-transitory computer readable medium and/or may be transmitted and stored along with other device data 202 in a datastore 208 at the server computer 135. In an embodiment, user profiles may be created for various users of the vehicle routing system 100. For example, a profile may be created for each driver and/or child in a particular school district or school. A user profile may include information such as a unique user identification, routes associated with the user, starting and ending locations (e.g., destinations) associated with the user, etc.

In some embodiments, the device data 202 and/or historical data 204 may be collected and transmitted to a server computer 135. The data 202, 204 may be stored at the server computer 135 using one or more datastores 208, such as a database, data table, or any other data storage mechanism suitable for storing data. For example, the datastore 208 may include tables relating particular users with particular vehicle routes. In some embodiments, the data 202, 204 may be maintained at the datastore 208 using one or more tables. The one or more tables may include entries of data representing routes drivers traveled in past instances to arrive at a particular destination from a particular starting location. The one or more tables may further include entries of data representing transitions at identified waypoints (e.g., intersections, bus stops, merge conditions, on-ramps and off-ramps to highways or freeways or other traffic transition condition) for a route. The one or more tables may further include entries of data representing each path in a route (e.g., a segment of a road/route between each identified waypoint or transition), which may include individual sections of road that have been traveled by a vehicle in servicing the particular route. In an embodiment, the one or more tables in the datastore 208 may be continuously and/or intermittently updated as information is received at the server computer 135. In particular, transitions, waypoints, route segments, identified in the datastore table may be updated after each ride to update the training data 206. For example, a route identified in the datastore table may be updated to include a new waypoint, which may then be included in a future selected route (e.g., updated suggested route) assigned to a vehicle. These factors may affect probability calculations which will be discussed below, in choosing the most likely route that a driver will follow.

In an embodiment, the training data 206 stored at the server computer 135 may be used to train a machine learning model 210 maintained at the server computer 135 to generate a suggested route. For example, the training data 206 may be used to train a machine learning model 210 to output suggested routes for a particular user and/or vehicle. In some embodiments, the machine learning model 210 may be trained to generate suggested route(s) and/or combination of suggested routes with a high probability of actually being traveled by particular users and/or vehicles. In an example, the training data 206 may indicate routes followed by a vehicle during one or more past instances of travel, where the vehicle is assigned to travel between a starting location and a destination location. Once trained using the data 206, the machine learning model 210 may be used to generate suggested routes for a current instance and/or future instance of travel for any user and/or vehicle assigned to travel between the starting location and the destination location. Moreover, the machine learning model 210 may generate suggested routes for users and/or vehicles, including users and/or vehicles not included in the training data 206. In an embodiment, when the machine learning model 210 is executed with the training data 206, the model 210 may be trained to identify the differences between a past instance of suggested routes for a vehicle and the route actually traversed by the vehicle. For example, the machine learning model 210 may be trained to compare a suggested route for a bus and the route the bus ultimately traveled, identifying differences in various aspects of the two routes.

As such, the information collected and stored as training data 206 may be used to help predict a route based on the probability of a driver following a particular route without needing re-routing instructions from the server computer 135. By using the techniques described herein to predict the route a driver will actually take and supplying turn-by-turn navigation for that particular route, the server computer 135 may be capable of more accurately predicting an estimated arrival time (as compared to alternative arrival times determined using conventional routing techniques), which is imperative in many instances. For example, having an accurate prediction of an estimated arrival time is essential when school buses pick up and drop off children. As a result of the techniques described herein, parents may enjoy a heightened accuracy of estimated arrival times, which makes the drop-off and pickup process more efficient for the bus driver, the children who ride the bus and the parents of the children.

FIG. 3 illustrates an exemplary machine learning model 210 for optimizing vehicle routing suggestions, according to various embodiments. As discussed in detail above, a machine learning model 210 at a server computer 135 may be trained with training data 205 in the form of historical data 204 and/or device data 202 associated with a vehicle routing system 100. In an example, historical data 204 and/or device data 202, such as travel distance, fuel use, pickup and drop off duration, beginning and ending route locations, speed of travel, rider verification information, driver and vehicle information, etc., may be converted into inputs for the machine learning model 210. Once trained, the machine learning model 210 may be utilized to generate current suggested routes 304 and future suggested routes 304 for a particular vehicle or user based on a received routing request 302.

In an embodiment, a routing request 302 may be received at the server computer 135. The routing request 302 may be associated with providing a ride service by a vehicle to a passenger for a current instance or future instance of travel. For example, a parent of a child may use a ride requester device 110 to request a bus pick up of their child from their home location and drop of their child at a school. In turn, a routing request 302 may be sent to the server computer 135 indicating the requested ride service for the child. Upon receipt of the routing request 302 the server computer 135 may be configured generate and utilize an input in the machine learning model 210. The input can include any combination of information associated with the routing request 302, one or more of the devices 110, 115, 120, 125, 130, user(s) associated with the one or more devices 110, 115, 120, 125, 130, passenger information, or any other information required to determine a suggested route 304. For example, a start location and a destination can be generated from the routing request 302 and used as an input for the machine learning model 210.

Responsive to receipt of the routing request 302, the machine learning model 201 may be configured to generate a suggested route 304 for a current instance and/or future instance of travel of a vehicle. In an embodiment, to generate the suggested route 304, a plurality of routes connecting the start location and destination associated with the routing request may be identified. The connecting routes may be identified from among historical data 204 representing historical route information collected over a period of time from one or more vehicles. For example, the historical data 204 at the server computer 135 may include historical route information related to a plurality of routes traveled by vehicles between a start location and a destination. The historical route information may be reported to the server computer 135 during the time period the vehicles are traveling between the start location and the destination. Once the plurality of routes connecting a start location and destination are identified, a suggested route 304 and/or a future selected route may be selected from among the plurality of routes for a current instance and/or future instance of travel between the start location and destination. For example, a route may be selected for a vehicle to follow for a current instance or future instance of travel between a start location and destination. As discussed in more detail with respect to FIG. 4, the selection of the suggested route 304 may be based on the selected route (e.g., suggested route 304) having a higher probability to be taken than the remaining routes in the plurality of routes.

The server computer 135 may transmit the selected route (e.g., the suggested route 304) along with routing information associated with the selected route (e.g., suggested route 304) to one or more devices 110, 115, 120, 125, 130 of the vehicle routing system 100. In an embodiment, routing information may include a vehicle assigned to travel the selected route (e.g., suggested route 304), one or more passengers assigned to travel the selected route (e.g., suggested route 304), and/or routing navigation formation for the selected route (e.g., suggested route 304). For example, routing navigation information of the selected route may be transmitted to a device associated with a vehicle assigned to travel the selected route. In an embodiment, the routing information may further include vehicle stop information and arrival times for pick up at vehicle stops. For example, bus stop information may be provided to a user device 115 indicating the location of the bus stop where a child is to be picked up by the bus, as well, as the time the pick-up is to occur.

In an embodiment, the selected route (e.g., suggested route 304) and/or routing information may be transmitted to one or more devices 110, 115, 120, 125, 130 based on the user(s) associated with the device 110, 115, 120, 125, 130. For example, the user device 115 may be associated with various users, such as a parent/guardian of a child bus rider, and, as a result, routing information relating to picking up the child bus rider may be transmitted to the user device 115. Additionally or alternatively, the user device 115 may be implemented as separate devices where a first user device 115 is associated with the child rider and a second user device 115 is associated with a parent, guardian, or other supervisor of a child. In this instance, routing information relating to the picking up of the child may be sent to both the first user device 155 associated with the child and the second user device 115 associated with the parent, guardian, or other supervisor of the child. In another example, the server computer 135 may transmit individual route information associated with the selected route (e.g., suggested route 304) to a bus driver via the driver device 120 of the vehicle routing system 100. For instance, the driver device 120 may receive an optimized route from the server computer 135 for picking up a ride requester, such as a child, based on location information associated with the ride requester, such as a home or a school address and/or prior pickup/drop off history locations for children on a particular route. The individual route information may include a mandatory bus route for the driver to follow with a stop sequence that is identified along the individual route. The individual route information may also include turn-by-turn navigation instructions with expected drive time duration, arrival times, and distance for the bus driver, based on historical rides as discussed above.

As discussed with respect to FIG. 2 above, the machine learning model 210 may be iteratively trained using data 202, 204 continuously and/or intermittently received at the server computer 135. The data 202, 204 may be received from the one or more devices 110, 115, 120, 125, 130 associated with the vehicle routing system 100. For example, a driver device 120 may transmit data 202, 204 intermittently to the server computer 135. In an embodiment, the received data 202, 204 may be associated with route information. For example, the data 202, 204 may be associated with road conditions such as, new construction, a road closure, etc. When the data 202, 204 is received, the server computer 135 may update the datastore 208 based on the data 202, 204. As a result, the updated data 202, 204 at the datastore 208 may then be implemented to iteratively train the machine learning model 210 to produce an updated suggested route 304. For example, the server computer 135 may receive information from a driver device 120 which may be used to optimize routes based on learning from past driver routes and/or driver input to the driver device 120 with new information (e.g., information indicating a new waypoint, such as a street closure, construction, etc.). Moreover, future selected routes (e.g., suggested routes 304)

generated by the server computer 135 may further be based on the updated data 202, 204. The machine learning model 210 may be iteratively trained to optimize various aspects of the vehicle routing system 100. In an embodiment, the suggested routes 304 may be updated to optimize the enforcement of particular driving patterns, such as optimizing a route to prevent U-turns, enforcing curbside pickup to avoid children crossing streets.

In an embodiment, the server computer 135 may track a vehicle via one or more devices 110, 115, 120, 125, 130 during travel and ensure compliance with the optimized route. If the one or more devices 110, 115, 120, 125, 130 indicates that a vehicle is not following the optimized suggested route 304, the server computer 135 may send a message to the one or more devices 110, 115, 120, 125, 130, to allow either the users of said devices 110, 115, 120, 125, 130 or the server computer 135 to contact the driver of the vehicle with route correction instructions to enhance adherence to the suggested route 304 calculated as the most probable route for the driver to follow. The server computer 135 may update the datastore 208 based on this lack of compliance with the turn-by-turn navigation instructions to inform the machine learning model 210 of new likely routes for at least one particular driver.

In an embodiment, when a vehicle is operating, a real time location may be provided to one or more devices 110, 115, 120, 125, 130. For example, real time location for a bus may be provided to a user device 115 so that the child assigned to said bus may identify where the bus is currently located as well as the arrival time of the bus. Based on information received from one or more devices 110, 115, 120, 125, 130, the server computer 135 may maintain estimated global positioning system ("GPS") waypoints and estimated time of arrival ("ETA") information for each ride, which may be constantly updated based on information provided by one or more devices 110, 115, 120, 125, 130. This ETA information may be more accurate than what is currently available (e.g., may provide a more accurate arrival time as compared to an alternative arrival time generated using conventional routing techniques) because the ETA is based on the probability that a route will be followed by a vehicle assigned to travel said route and may be updated based on deviations to the route in real-time as compared to conventional routing techniques which are based on the fastest route between two places (e.g., alternative arrival time). For example, the arrival time to the destination based on the selected route (e.g., suggested route 304) may be more accurate than an alternative arrival time based on a route other than the selected route (e.g., suggested route 304), such as a route randomly chosen by a vehicle driver. As a result, the one or more devices 110, 115, 120, 125, 130 may be able to provide real-time routing, navigation, and path information based on a current location of the one or more devices 110, 115, 120, 125, 130.

In an embodiment, routing, navigation, and path information may be displayed on a screen associated with a device the one or more devices 110, 115, 120, 125, 130 via a GUI. For example, routing navigation information for the selected route (e.g., suggested route 304) may be displayed on the driver device 120 via a GUI, where the driver device 120 is associated with the vehicle assigned to travel the selected route (e.g., suggested route 304). A user may receive, via the user device 115, expected vehicle path information on a map displayed via a GUI on the user device 115. Thus, a user of the user device 115 may be able to track the vehicle associated with the driver device 120 in real-time and observe where the vehicle is currently and when the vehicle will be at a specific stop, which may be identified by waypoints provided to the user from the server computer 135 via the GUI.

Figure 4:
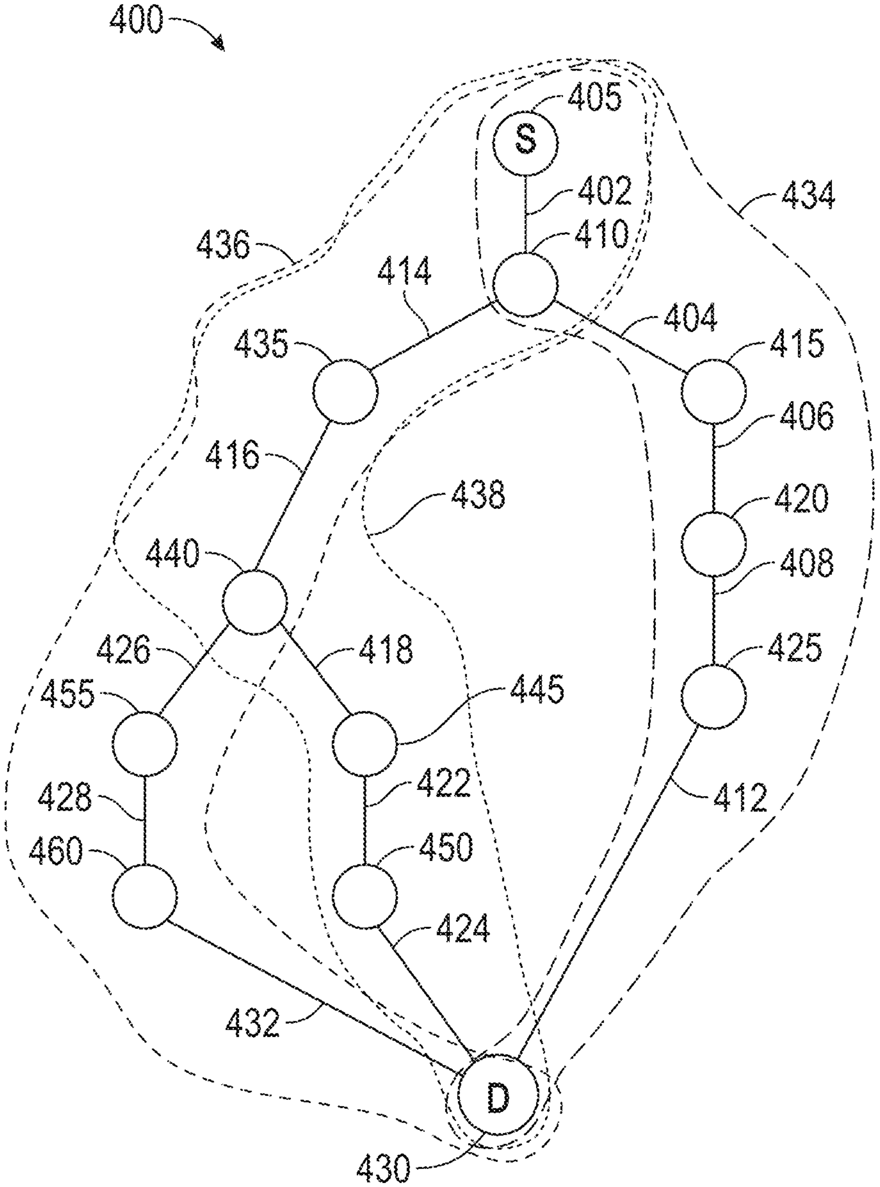
FIG. 4 illustrates a diagram of an exemplary routing between a start location and a destination, according to various embodiments.

FIG. 4 illustrates a diagram of an exemplary routing process 400 between a starting location 405 and a destination 430, according to various embodiments. For example, routing process 400 begins at the starting location 405 and proceeds to the destination 430 via a number of route segments 402, 404, 406, 408, 412, 414, 416, 418, 422, 424, 426, 428, 432 connected via waypoints 410, 415, 420, 425, 435, 440, 445, 450, 455, 460. Once a routing request 302 is received and/or selected, the machine learning model 210 may be utilized to calculate a probability for each route possible between a starting location 405 and a destination 430. The probability representing a likelihood that a particular route will be followed by a vehicle based on data 202, 204, such as historical route information.

In an embodiment, the routing process 400 may begin by identifying potential past routes 434, 436, 438 between a starting location 405 and a destination 430. For example, as shown in FIG. 4, routing process 400 may identify three potential past routes 434, 436, 438. A route 434, 436, 438 may be defined by waypoints 410, 415, 420, 425, 435, 440, 445, 450, 455, 460 connected via route segments 402, 404, 406, 408, 412, 414, 416, 418, 422, 424, 426, 428, 432. In the illustrated example, route 434 includes route segments 402, 404, 406, 408, and 412 which are connected via waypoints 410, 415, 420, and 425 (starting at the starting location 405 and ending at the destination 430); route 436 includes route segments 402, 414, 416, 418, 422, and 424 which are connected via waypoints 410, 435, 440, 445, and 450 (starting at the starting location 405 and ending at the destination 430); and route 438 includes route segments 402, 414, 416, 426, 428, and 432 which are connected via waypoints 410, 435, 440, 455, and 460 (starting at the starting location 405 and ending at the destination 430). Each waypoint 410, 415, 420, 425, 435, 440, 445, 450, 455, 460 may indicate a transition location along a route 434, 436, 438, such as intersections, bus stops, merge conditions, on-ramps and off-ramps to highways or freeways or other traffic transition condition. For example, waypoint 455 may indicate a bus stop location along route 436. In various embodiments, a waypoint 410, 415, 420, 425, 435, 440, 445, 450, 455, 460 may be predetermined and/or based at least in part on the data 202, 204 received at the server computer 135. For example, waypoint 445 may be based on historical data 204 collected from a driver device 120 associated with a previous trip along route 438 including waypoint 445. In another example, a child may use a user device 115 to request a bus pick up at their home. In response, the child's home location may be added as a new waypoint 460 along route 436.

While more or less routes are possible, the routing process 400 is merely exemplary of routing principles used for identifying a particular route. For example, the routing process 400 may include ten possible routes between the starting location 405 and the destination 430 or the routing process 400 may only include one possible route between the starting location 405 and the destination 430. Moreover, in an embodiment, route 434, 436, and 438 may not be the only possible routes 434, 436, 438 but have been selected for probability evaluation based on the collected data 202, 204. For example, routes 434, 436, 438 may be selected from a larger number of routes because the historical data 204 indicates that routes 434, 436, 438 have historically been taken by drivers. In this way, the vehicle routing system 100 may focus evaluation on the roads that have been previously used to get to the destination 430 (e.g., a local school).

Once potential past routes 434, 436, 438 are identified, the server computer 135 may access the datastore 208 and utilize the data 202, 204 via the machine learning model 210 to calculate a likelihood (e.g., the probability) that a driver will pick one of the potential past routes 434, 436, 438, which can be done on a probability per route segment 402, 414, 416, 418, 422, 424 basis. Specifically, one or more datapoints derived from the data 202, 204 may be assigned to each waypoint 410, 415, 420, 425, 435, 440, 445, 450, 455, 460 along each route 434, 436, 438. In an embodiment, a datapoint may be derived from the data 202, 204 stored at the server computer 135 and may be associated with a past instance of travel to and/or from a particular waypoint 410, 415, 420, 425, 435, 440, 445, 450, 455, 460. For example, if a driver has traveled to waypoint 410 five times in the past, then waypoint 410 may have five available datapoints assigned.

Next, for each waypoint, a ratio of datapoints assigned to a particular waypoint may be calculated. Specifically, the ratio may be defined by datapoints assigned to a particular waypoint (e.g., data associated with number of trips taken by driver(s) to the particular waypoint) over a total count of all available datapoints assigned to the pervious waypoint (e.g., data associated with the number of trips taken by driver(s) from the previous waypoint). In an embodiment, the calculated ratio of datapoints for a waypoint may represent a likelihood (e.g., a probability) that a driver will travel to each subsequent waypoint along a route.

For example, in an exemplary embodiment, the ratio of datapoints for waypoint 410 may be determined based on the historical data 204 as follows: it can be determined that eighteen datapoints are assigned to waypoint 410 (e.g., eighteen past trips taken by driver(s) proceeded to subsequent waypoint 410). Moreover, it can be determined that eighteen available datapoints are assigned to starting location 405 (e.g., eighteen total trips were taken from starting location 405, the previous waypoint to subsequent waypoint 410). Thus the ratio of datapoints at waypoint 410 is eighteen over eighteen (e.g., a probability of 100% (18/18) that a driver would proceed to the subsequent waypoint 410 from the previous starting location 405). Next, the ratio of datapoints for waypoint 415 (e.g., one of the two waypoints 415, 435 subsequent to waypoint 410) may be determined based on the historical data 204 as follows: it can be determined that seven datapoints are assigned to waypoint 415 (e.g., seven past trips taken by driver(s) proceeded to subsequent waypoint 415). Moreover it can be determined that, as stated above, eighteen available datapoints are assigned to waypoint 410 (e.g., eighteen total trips were taken from waypoint 410, the previous waypoint to waypoint 415). Thus the ratio of datapoints at waypoint 415 is seven over eighteen (e.g., a probability of 39% (7/18) that a driver would proceed to waypoint 415 from the previous waypoint 410). Finally, the ratio of datapoints for waypoint 435 (e.g., one of the two waypoints 415, 435 subsequent to waypoint 410) may be determined based on the historical data 204 as follows: it can be determined that 11 datapoints are assigned to waypoint 435 (e.g., eleven past trips taken by driver(s) proceeded to subsequent waypoint 435). As stated above, eighteen available datapoints are assigned to waypoint 410 (e.g., eighteen total trips were taken from waypoint 410, the previous waypoint to subsequent waypoint 435). Thus the ratio of datapoints at waypoint 435 is eleven over eighteen (e.g., a probability of 61% (11/18) that a driver would proceed to subsequent waypoint 435 from the previous waypoint 410).

After a ratio of datapoints is calculated for each waypoint 410, 415, 420, 425, 435, 440, 445, 450, 455, 460 along each route 434, 436, 438 between the starting location 405 and the destination 430, the server computer 135 may aggregate the waypoint probabilities per route 434, 436, 438 (e.g., aggregate the probabilities for waypoints 410, 435, 440, 455, and 460 for route 436, aggregate the probabilities for waypoints 410, 435, 440, 445, and 450 for route 438, and aggregate the probabilities for waypoints 410, 415, 420, and 425 for route 434) and select the route with the highest probability to be traveled by a vehicle assigned to travel the suggested route 304.

Continuing from the exemplary embodiment discussed above, a likelihood (e.g., the probability) that a particular route segment will be used for a ride service may be determined as follows for route 436. As stated, the probability that a vehicle will travel from waypoint 410 to waypoint 435 via route segment 414 is 61% (11/18). From waypoint 435 there is only one route segment 416 which proceeds to subsequent waypoint 440, so the probability that a vehicle will travel from waypoint 435 to waypoint 440 is 100% (e.g., eleven trips of the eleven trips taken from waypoint 435 proceeded to waypoint 440). It is at waypoint 440 where a decision is to be made as to whether it is more likely that a driver will select to go to subsequent waypoint 455 or subsequent waypoint 445 from waypoint 440. At this point, the server computer 135 may count the number of "downstream" available datapoints from waypoint 440. In this case, there are eleven possible available datapoints between waypoint 440 and destination 430 (e.g., previous vehicles took route 438 six times and route 436 five times), including waypoints 440, 445, 450, 455, and 460 and route segments 418, 422, 424, 426, 428, and 432. Counting the number of available datapoints from waypoint 440 to waypoint 455 yields six total available datapoints assigned to waypoint 455 (e.g., six past trips taken by vehicle(s) proceeded to waypoint 455 along route 438, according to this example). Thus the ratio of datapoints at waypoint 455 is six datapoints divided by eleven datapoints (e.g., a probability of 55% (6/11) that a driver would proceed to waypoint 445 from the previous waypoint 440). Finally, the probability that a vehicle will travel from waypoint 455 to waypoint 460 via route segment 428 is 100% because only one route segment 428 exists between waypoint 455 and waypoint 460. The same is true of the probability that a vehicle will travel from waypoint 460 to the destination 430 along route segment 432.

Once the waypoint probabilities are calculated, the server computer 135 may aggregate the waypoint probabilities per route 434, 436, 438 and selects the route 436 with the highest probability as the suggested route 304. In the exemplary embodiment discussed above, the server computer 135 would select route 436 as the suggested route 304. This is because, in the routing process 400, at each junction point (e.g., waypoints 410, 440) there is a higher probability that a vehicle will travel from a junction point (e.g., waypoints 410, 440) to a subsequent waypoint 435, 455 along route 436 in comparison to the probability that a vehicle will travel from a junction point (e.g., waypoints 410, 440) to an alternative subsequent waypoint 415, 445 along routes 434 and 438. In other words, route 436 would be selected as the most historically probable route for the driver to follow and, therefore, the route 436 that will result in the fewest rerouting requests from vehicles in the future.

By selecting the routes 436 the drivers prefer based on collected data 202, 204 with or without the use of artificial intelligence (e.g., a route selection algorithm, a machine learning algorithm, a machine learning model 210, etc.) to identify driving patterns between waypoints 410, 415, 420, 425, 435, 440, 445, 450, 455, 460, a route 434, 436, 438 can be optimized based on unpredictable human elements, while gaining higher compliance to the suggested route 304, reducing the number of API re-routing calls, and providing a more exact estimated time of arrival from the starting location 405 (as compared to an alternative arrival time generated using conventional routing techniques).

In an embodiment, in the case of unique or new routes, the server computer 135 may determine all known historical routes that go to a specific destination 430. If the destination is not known, then a unique or new route may still be identified by utilizing the data 202, 204 in the datastore 208. If the server computer 135 determines that only one known route exists, the server computer 135 may select that route. However, if other known historical routes exist in the datastore 208, the server computer 135 may select the closest waypoint, a new waypoint, or the same waypoint (depending on whether or not the waypoint exists in the datastore 208) and iterate the probabilities using the techniques discussed above to determine the most likely route for the driver to select. For example, if destination 430 is selected, but destination 430 is not known, then a route 434, 436, 438 may still be identified by the server computer 135. Specifically, the server computer 135 may begin by identifying the closest previous waypoint to the destination 430 (e.g., waypoints 460, 450, and 425). Once these waypoints are identified, the associated routes 434, 436, 438 may also be determined by iteratively identifying the next closest previous waypoint until the starting location 405 is reached.

In an embodiment, if the likelihood (e.g., probability) that a vehicle is likely to proceed to two or more subsequent waypoints is determined to be equivalent, the server computer 135 may pick one of the routes at random or based on criteria other than probability. For example, if is determined that the probability a vehicle will travel from waypoint 410 to either waypoint 435 or waypoint 415 is 50% for either option, the server computer 135 may pick either waypoint 435 or waypoint 415 based on the waypoint selected during the most recent prior instance of a vehicle traveling between the starting location 405 and the destination 430.

In an embodiment, as the server computer 135 obtains data 202, 204 from a vehicle servicing a particular route, the probabilities of the plurality of waypoints may change. For example, when data 202, 204 is received form vehicle servicing a particular route, the datapoint ratios for each waypoint along the particular route may be updated. The outcome of the updated datapoint ratios may result in different route being determined as the suggested route 304. In this case, the route may be continuously optimized and updated suggested routes 305 may be sent vehicles servicing the particular route as the data 202, 204 is updated. By continuously optimizing the suggested route 304, the number of re-route API calls to the server computer 135 may be reduced.

Figure 5:
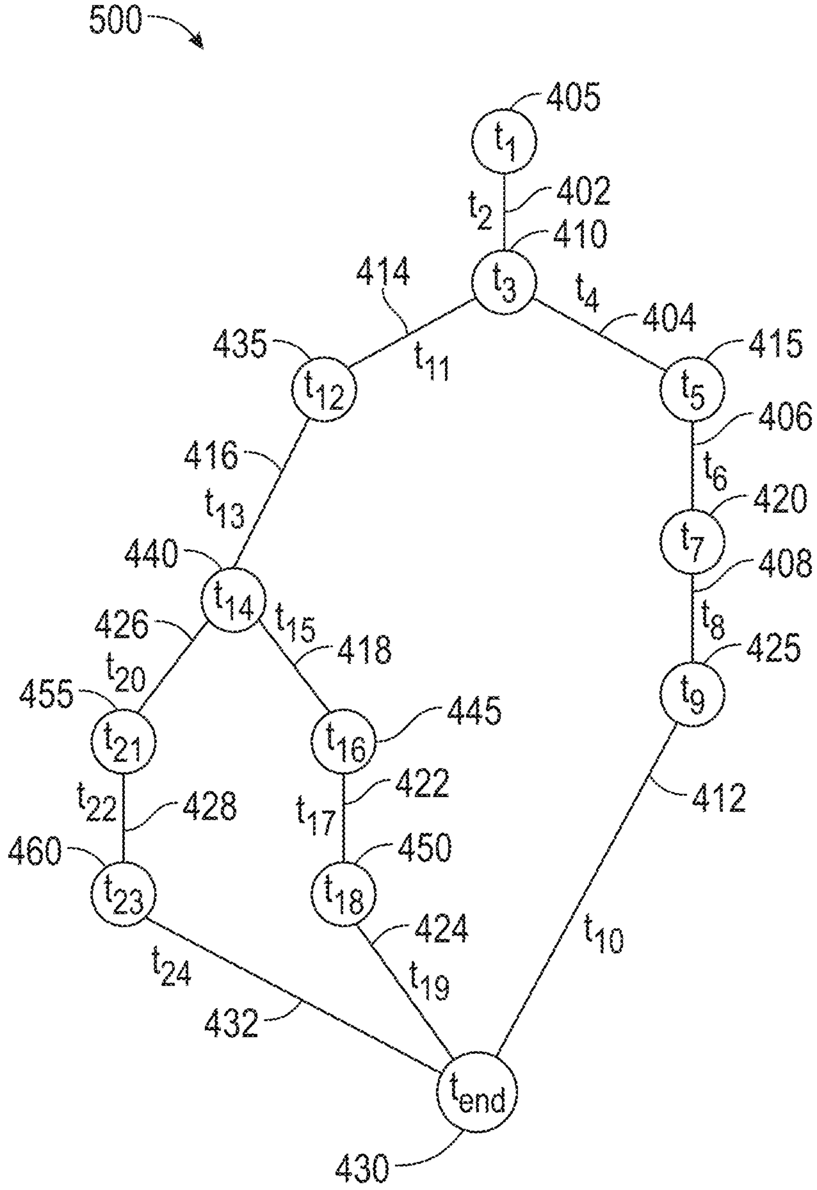
FIG. 5 illustrates a diagram of an exemplary real-time estimated time of arrival determination based on routing between a start location and a destination, according to various embodiments.

FIG. 5 illustrates a diagram of an exemplary real-time estimated time of arrival determination 500 based on routing between a starting location 405 and a destination 430, according to various embodiments. The routing shown in FIG. 5 is identical to the routing shown in FIG. 4, discussed above. However, FIG. 5 illustrates a time duration for each route segment 402, 404, 406, 408, 412, 414, 416, 418, 422, 424, 426, 428, 432 and/or waypoint 405, 410, 415, 420, 425, 430, 435, 440, 445, 450, 455, 460. For example, waypoint 410 may be associated with a time duration $t_3$ which I the duration of time that a vehicle may be located within waypoint 410 while servicing the route 434, 436, 438. Similarly, the starting location 405 and the destination 430 may be associated with a particular time duration $t_1$ and $t_{end}$, respectively. Moreover, waypoints 410, 415, 420, 425, 435, 440, 445, 450, 455, and 460 may also be associated with a particular time duration, $t_3$, $t_5$, $t_7$, $t_9$, $t_{12}$, $t_{14}$, $t_{16}$, $t_{18}$, $t_{21}$, and $t_{23}$, respectively. Likewise, route segments 402, 404, 406, 408, 412, 414, 416, 418, 422, 424, 426, 428, and 432 may be associated with a particular time duration, $t_2$, $t_4$, $t_6$, $t_8$, $t_{10}$, $t_{11}$, $t_{13}$, $t_{15}$, $t_{17}$, $t_{19}$, $t_{20}$, $t_{22}$, and $t_{24}$, respectively.

To determine an estimated time of arrival 500, the server computer 135 may proceed by identifying a time duration $t_1$-$t_{end}$ for each waypoint 405, 410, 415, 420, 425, 430, 435, 440, 445, 450, 455, 460. In an embodiment, the time duration $t_1$-$t_{end}$ may be a baseline time duration associated with each particular waypoint 405, 410, 415, 420, 425, 430, 435, 440, 445, 450, 455, 460. For example, baseline time duration $t_3$ of 10 minutes may be associated with waypoint 410. The baseline time durations may be obtained from historical route information from one or more vehicles. For example, server computer 135 may calculate a speed and distance associated with each particular waypoint that is used for a baseline time duration assigned to each particular waypoint 405, 410, 415, 420, 425, 430, 435, 440, 445, 450, 455, 460. The speed and distance information may be retrieved by the server computer 135 from among the historical data 204 stored at a datastore 208.

In an embodiment, an adjustment factor may be determined for each waypoint 405, 410, 415, 420, 425, 430, 435, 440, 445, 450, 455, 460. The adjustment factor may be determined based on historical route information stored as historical data 204 to add or subtract form the time duration from the time duration $t_1$-$t_{end}$ associated with each waypoint 405, 410, 415, 420, 425, 430, 435, 440, 445, 450, 455, 460. For example, an adjustment factor associated with the time duration $t_3$ for waypoint 410 may be retrieved by the server computer 135 from historical data 204 stored at the datastore 208. In some embodiments, the historical data 204 may be weighed (e.g., data element is multiplied with an associated coefficient indicative of the age of the data element) based on the age of the historical data 204 to prioritize newer data and de-prioritize (de-deemphasize) older data. Accordingly, data associated with relatively large weights (e.g., recent data) may have more influence in the adjustment factor than the data that have smaller weights (e.g., older data). For example, each element of the historical data 204 may be associated with a coefficient indicative of an age of the element of the historical data 204. This way, embodiments may incorporate recency of historic data in the probability calculation.

The adjustment factor may be based on various vehicle and/or route factors which may affect the duration of travel. In an embodiment, the adjustment factor may be based on known events planned at or within a predetermined distance of a particular segment 402, 404, 406, 408, 412, 414, 416, 418, 422, 424, 426, 428, 432 or waypoint 405, 410, 415, 420, 425, 430, 435, 440, 445, 450, 455, 460. Additionally or alternatively, the adjustment factor may be based on at least one of a time of day for servicing the routing request, the day for servicing the routing request, a road condition along the selected route, traffic data, weather data, and/or local events data. For example, local event data received by the server computer 135 may indicate that a football game is occurring at a stadium within a predetermined distance of route 436.

In turn, an adjustment factor based on the event data associated with the football game may be determined by the server computer 135 for the one or more waypoints 405, 410, 435, 440, 455, 460, 430 along the route 436.

Once a time duration $t_1$-$t_{end}$ is identified for one or more waypoints 405, 410, 415, 420, 425, 430, 435, 440, 445, 450, 455, 460 and an adjustment factor is determined for each time duration $t_1$-$t_{end}$, the time durations $t_1$-$t_{end}$ may be augmented with the adjustment factors by the server computer 135. Specifically, an augment time duration $t_1$-$t_{end}$ for each waypoint 405, 410, 415, 420, 425, 430, 435, 440, 445, 450, 455, 460 may be determined by multiplying the time duration $t_1$-$t_{end}$ by the adjustment factor associated with each waypoint. For example, For waypoint 410, the time duration $t_3$ may be multiplied by the adjustment factor $a_3$ associated with waypoint 410. An estimated time of arrival 500 may then be calculated by determining the sum of all the augmented time durations. As a result an more accurate real-time estimated time of arrival 500 may be transmitted to one or more devices 110, 115, 120, 125, 130.

In the exemplary embodiment described with respect to FIG. 4, the server computer 135 determined that a particular route 436 among the plurality of possible routes 434, 436, 438 is more probable to service by a vehicle given historical data 204 associated with servicing the routes 434, 436, 438, collected as discussed above. Specifically, route 436, which includes waypoints 405, 410, 435, 440, 455, 460, and 430 and segments 402, 414, 416, 426, 428, and 432 is determined to be the most probable route to be serviced by a vehicle. At this juncture, the server computer 135 may proceed with calculating an estimated time of arrival 500 for the vehicle based on identifying which waypoints 405, 410, 435, 440, 455, 460, 430 and segments 402, 414, 416, 426, 428, 432 will be traversed during servicing of the route 436. To do so, the server computer 135 may utilize the following formula to determine the estimated time of arrival 500 for a vehicle to arrive at destination 430: $(t_1*a_1)+(t_2*a_2)+(t_3*a_3)+(t_{11}*a_{11})+(t_{12}*a_{12})+(t_{13}*a_{13})+(t_{14}*a_{14})+(t_{20}*a_{20})+(t_{21}*a_{21})+(t_{22}*a_{22})+(t_{23}*a_{23})+(t_{24}*a_{24})$=ETA (e.g., estimated time of arrival 500), where $t_x$ represents a baseline time duration for a waypoint 405, 410, 435, 440, 455, 460, 430 and/or segment 402, 414, 416, 426, 428, 432 and ax represents an adjustment factor for each time duration, such as time of day, day of the week, weather, road conditions, and/or any other reason that traffic may be more or less congested (ax may be considered to be greater than 0 and/or less than 0 for purposes of this disclosure). By implementing this method of calculating an estimated time of arrival 500, the accuracy of predicting an estimated time of arrival 500 significantly increased, which is particularly important in various contexts such as for a school bus transporting children to and from a school. For example, in a school bus context, a parent of a child riding the school bus may desire to meet a child at the school bus to pick the child up directly. Informing the parent of exactly when the bus will arrive leads to efficiency for the parent in meeting the bus and prevents the parent waiting for the difference in time between conventional estimated time of arrival predictions and an estimated time of arrival 500 based on the route probability methods disclosed herein.

In addition to the estimated time of arrival 500 being transmitted in real-time to one or more devices 110, 115, 120, 125, 130 and the estimated time of arrival 500 may also be adjusted in real-time if the vehicle selects a route other than the suggested route 304. In an embodiment, the server computer 135 may receive a routing update from a vehicle where the routing update includes a new waypoint 405, 410, 415, 420, 425, 430, 435, 440, 445, 450, 455, 460 and/or segment 402, 404, 406, 408, 412, 414, 416, 418, 422, 424, 426, 428, 432. Once received, the server computer 135 may update the route selection algorithm (e.g., the machine learning model 210) based on the routing update. Then, using the techniques described above with respect to FIG. 5, the server computer 135 may determine a new estimated time of arrival 500 based the waypoints 405, 410, 415, 420, 425, 430, 435, 440, 445, 450, 455, 460 (e.g., known and/or newly generated waypoints) identified in the new route 434, 436, 438 (e.g., a known and/or newly generated route). For example, an estimated time of arrival 500 may be determined based on route 436, shown in FIGS. 4 and 5, the generated suggested route 304 (e.g., the most probable route to be taken by a vehicle). However, a particular driver may disregard the suggested route 304 and proceed to route 434 instead. In such a scenario, the server computer 135 may detect, based on GPS information provided through the communications network 105, that a less probable route was selected (e.g., not the suggested route 304) and the server computer 135 may immediately recalculate an estimated time of arrival 500 for route 434 in real-time. As a result, the recalculated estimated time of arrival 500 may be transmitted to one or more devices 110, 115, 120, 125, 130 informing users as soon as a route change has been detected, such as via a GPS report from the driver device 120 or an API re-routing call from the driver device 120. In an embodiment, the formula for calculating the new estimated time of arrival 500 may be similar to the formula discussed above which adds each of the augmented time durations, determined by multiplying the time duration $t_1$-$t_{end}$ by the adjustment factor associated with each waypoint 405, 410, 415, 420, 425, 430, 435, 440, 445, 450, 455, 460. For the preceding example, the formula would be $(t_1*a_1)+(t_2*a_2)+(t_3*a_3)+(t_4*a_4)+(t_5*a_5)+(t_6*a_6)+(t_7*a_7)+(t_8*as)+(t_9*a_9)+(t_{10}*a_{10})$=new estimated time of arrival 500. In the context of a school bus transporting children, the resulting update to the real-time estimated time of arrival 500 can provide parents with sufficient time to adjust schedules and plans to meet a school bus at the most probable and accurate estimated time of arrival 500 based on the re-routing request and the driver following a less probable path (e.g., an alternative route to the generated suggested route 304) to service the route.

In general, the formula for determining the estimated time of arrival 500 may be implemented as follows:

$$ETA = \sum_{i=0}^{n} t_i * a_i$$

Where t is a baseline time duration for a particular waypoint 405, 410, 415, 420, 425, 430, 435, 440, 445, 450, 455, 460, a is an adjustment factor for the particular waypoint 405, 410, 415, 420, 425, 430, 435, 440, 445, 450, 455, 460, and n is the total number of waypoints 405, 410, 415, 420, 425, 430, 435, 440, 445, 450, 455, 460 in the route 434, 436, 438 being the most probable route for selection by a vehicle (e.g., the suggested route 304), using the techniques described herein. As previously discussed, waypoints 405, 410, 415, 420, 425, 430, 435, 440, 445, 450, 455, 460 may indicate particular locations such as intersections, bus stops, or other road features. Moreover, segments 402, 404, 406, 408, 412, 414, 416, 418, 422, 424, 426, 428, 432 may be defined as features connecting and/or between waypoints 405, 410, 415, 420, 425, 430, 435, 440, 445, 450, 455, 460, such as road sections. In some embodiments, waypoints 405, 410, 415, 420, 425, 430, 435, 440, 445, 450, 455, 460 and segments 402, 404, 406, 408, 412, 414, 416, 418, 422, 424, 426, 428, 432 may both be considered waypoints 405, 410, 415, 420, 425, 430, 435, 440, 445, 450, 455, 460.

In an embodiment, the time duration at the waypoints 405 and 430 (e.g., starting location 405 and destination 430) may be augmented with embarkation and disembarkation data. For the starting location 405, the time duration $t_1$ at the waypoint 405 associated with the starting location 405 may be adjusted in view of embarkation data based on historical route information (e.g., historical data 204). As a result, the augment time duration $t_1$ may be adjusted to account for time spent on one or more passengers boarding a vehicle. In the example of a school bus, adjusting the time duration $t_1$ with embarkation data based on historical data 204 may generate an augment time duration $t_1$ which takes into account the time necessary to load children into a bus. Similarly, for the destination 430, the time duration $t_{end}$ at the waypoint 430 associated with the destination 430 may be adjusted in view of disembarkation data based on historical route information (e.g., historical data 204). As a result, the augment time duration $t_{end}$ may be adjusted to account for time spent on one or more passengers exiting the vehicle. In the example of a school bus, adjusting the time duration $t_{end}$ with disembarkation data based on historical data 204 may generate an augment time duration $t_1$ which takes into account the time necessary to deliver children at the end of the bus line. Since the time duration $t_1$, $t_{end}$ may be more or less constant, $t_1$ and $t_{end}$ may use historical embarkation and disembarkation data as augmentation data for calculating a time duration $t_1$ and $t_{end}$ for waypoints 405 and 430. In any case, the predictability of the route that will be followed for servicing the route increases the predictability and accuracy of an estimated time of arrival 500 over previous estimated time of arrival calculation solutions.

Figure 6A:
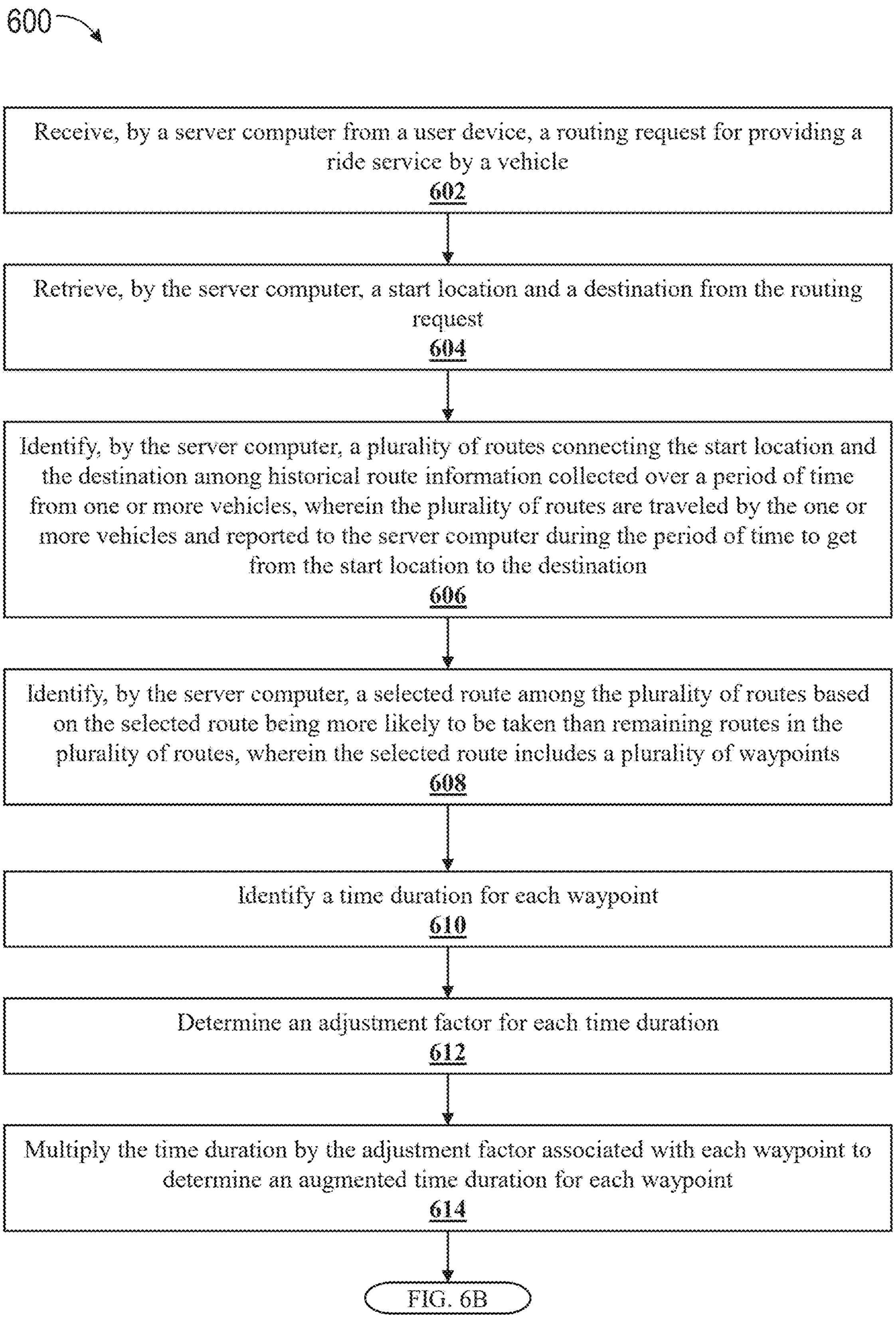
FIGS. 6A and 6B illustrate a method for providing accurate real-time estimated time of arrival determination based on routing between a start location and a destination, according to various embodiments.
Figure 6B:
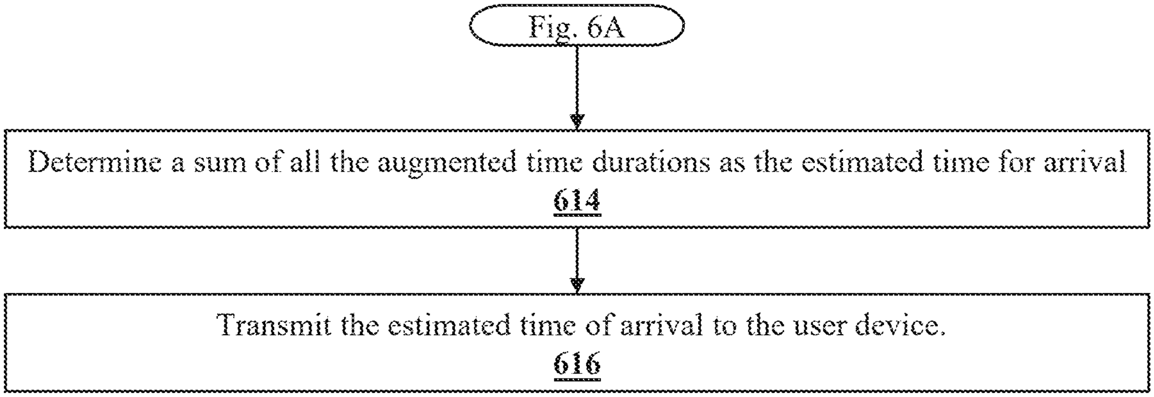

FIGS. 6A and 6B illustrate a method 600 for providing accurate real-time estimated time of arrival 500 determination based on routing between a starting location 405 and a destination 430, according to various embodiments. Method 600 begins at step 602 where a server computer 135, for example, may receive from a user device 115 a routing request 302 for providing a ride service by a vehicle. For example, a routing request 302 may be received at the server computer 135 for a bus service to pick up a child at their home and drop off the child at a school.

The method 600 may then proceed to step 604 where the server computer 135 may retrieve a starting location 405 and a destination 430 from the routing request 302. For example, the server computer 135 may retrieve a starting location 405 of a child's home and a destination 430 of a school from a routing request 302 for a bus service to pick up a child at their home and drop off the child at a school.

The method 600 may proceed to step 606, where the server computer 135 may identify a plurality of routes 434, 436, 438 connecting the starting location 405 and the destination 430 among historical route information (e.g., historical data 204) collected over a period of time from one or more vehicles. The plurality of routes 434, 436, 438 may be traveled by the one or more vehicles and reported to the server computer 135 during the period of time to get from the starting location 405 to the destination 430. For example, two routes, route A and route B, connecting the starting location 405 of the child's home to the destination 430 of the school may be identified by the server computer 135 from among the historical data 204 stored at a datastore 208.

The method 600 may proceed to step 608, where the server computer 135 may identify a selected route (e.g., a suggested route 304) among the plurality of routes 434, 436, 438 based on the selected route (e.g., the suggested route 304) having a higher probability to be taken than remaining routes in the plurality of routes 434, 436, 438. Moreover, the selected route (e.g., a suggested route 304) may include a plurality of waypoints 405, 410, 415, 420, 425, 430, 435, 440, 445, 450, 455, 460. For example, of the two routes, routes A and B, identified by the server computer 135, route A may be selected based on route A having a 60% probability of being taken by a vehicle as compared to route B with only a 40% probability of being taken by a vehicle. The likelihood that a vehicle will follow the suggested route 304 may be based on historical route information (e.g., historical data 204) and may be determined by calculating a probability at each route segment and/or waypoint along one or more potential routes.

The method 600 may proceed to steps 610 to 616, where the server computer 135 may determine an estimated time for arrival. At step 610, the server computer 135 may identify a time duration $t_1$-$t_{end}$ for each waypoint 405, 410, 415, 420, 425, 430, 435, 440, 445, 450, 455, 460. For example, baseline time duration $t_3$ of 10 minutes may be associated with waypoint 410. The time duration $t_1$-$t_{end}$ may be a baseline time duration obtained from historical route information (e.g., historical data 204). For example, server computer 135 may calculate a speed and distance associated with each particular waypoint 405, 410, 415, 420, 425, 430, 435, 440, 445, 450, 455, 460 that is used for a baseline time duration assigned to each particular waypoint 405, 410, 415, 420, 425, 430, 435, 440, 445, 450, 455, 460, where the speed and distance information is retrieved by the server computer 135 from among the historical data 204 stored at a datastore 208.

Next, the method 600 may continue to step 612, where the server computer 135 may determine an adjustment factor for each time duration $t_1$-$t_{end}$. The adjustment factor may be determined based on historical route information (e.g., historical data 204) to add or subtract from the time duration $t_1$-$t_{end}$ for each waypoint 405, 410, 415, 420, 425, 430, 435, 440, 445, 450, 455, 460. For example, an adjustment factor may be based on historical data 204 which indicates that a particular route 434, 436, 438 includes an express lane for buses. In turn, the adjustment factor may result in a reduced time duration $t_1$-$t_{end}$ for waypoints 405, 410, 415, 420, 425, 430, 435, 440, 445, 450, 455, 46 along said route 434, 436, 438.

The method 600 may proceed to step 614, where an augmented time duration may be determined for each waypoint 405, 410, 415, 420, 425, 430, 435, 440, 445, 450, 455, 460. Specifically, the time duration $t_1$-$t_{end}$ may be multiplied by the adjustment factor associated with each waypoint 405, 410, 415, 420, 425, 430, 435, 440, 445, 450, 455, 460. Proceeding to step 614 illustrated in FIG. 6B, the server computer 135 may determine a sum of all the augmented time durations as the estimated time for arrival 500. For example, for a vehicle traveling on route 436, the server computer 135 may utilize the following formula to determine the estimated time of arrival 500 for a vehicle to arrive at destination 430: $(t_1*a_1)+(t_2*a_2)+(t_3*a_3)+(t_{11}*a_{11})+(t_{12}*a_{12})+(t_{13}*a_{13})+(t_{14}*a_{14})+(t_{20}*a_{20})+(t_{21}*a_{21})+(t_{22}*a_{22})+(t_{23}*a_{23})+(t_{24}*a_{24})=ETA$. In some embodiments, the time duration at the waypoint 405 associated with the starting location 405 may further be adjusted in view of embarkation data determined based on historical route information (e.g., historical data 204) to account for time spent on one or more passengers boarding a vehicle. Similarly, the time duration at waypoint 430 associated with destination 430 may further be adjusted in view of disembarkation data determined based on historical route information (e.g., historical data 204) to account for time spent on one or more passengers exiting the vehicle.

The method may then proceed to step 616, where the server computer 135 may transmit estimated time of arrival to a device (e.g., user device 115). For example, estimated time of arrival information for a vehicle traveling on route A may be transmitted to a user device 115.

By utilizing the vehicle routing system 100 using the techniques described herein, more efficient and accurate estimated time of arrival information associated with one or more vehicles may be provided to riders and drivers associated with a vehicle and/or a fleet of vehicles. For instance, ETA information associated with a vehicle and/or fleet of vehicles may be calculated in a more accurate manner. That is, since the ETA information is based on the probability that a route will be followed by a vehicle assigned to travel said route, there will be minimal to no changes to the suggested route 304. Thus, the trip duration can be calculated accurately based on up-to-date (e.g., real time) information about traffic, weather, road conditions etc. on the known (e.g., recommended) route. Moreover, since the ETA may be further updated through the route service, a continuous or semi-continuous real-time up-to-date ETA may be provided to riders, drivers, and other individuals associated with a vehicle. As a result, the vehicle routing system 100 may provide increased energy and cost savings as well as providing users with more accurate ETA information from which to plan and schedule around said vehicle services.

The foregoing description has been presented for the purposes of illustration and description. It is not intended to be exhaustive or to limit the disclosure to the precise form disclosed. Many modifications and variations are possible in light of the above disclosure and teachings. Further, it should be noted that any or all of the aforementioned alternate implementations may be used in any combination desired to form additional hybrid implementations of the disclosure. For example, components described herein may be removed and other components added without departing from the scope or spirit of the embodiments disclosed herein or the appended claims.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system, comprising:

a server computer comprising a processor and a memory storing instructions that, when executed by the processor, cause the processor to perform steps comprising:

identifying a plurality of routes connecting a start location and a destination among historical route information collected over a period of time from one or more vehicles, wherein the plurality of routes are traveled by the one or more vehicles and reported to the server computer during the period of time to get from the start location to the destination;

determining an estimated time of arrival associated with a selected route among the plurality of routes, wherein the selected route includes a plurality of waypoints, determining comprising:

identifying a time duration for each waypoint;

determining an adjustment factor for at least one waypoint based on the historical route information, wherein the historical route information is weighted in accordance with a dynamic temporal weighting as a function of an age of the historical route information;

determining an augmented time duration based on the adjustment factor and the time duration associated with the at least one waypoint;

determining the estimated time of arrival based on at least the time duration for each waypoint and the augmented time duration for the at least one waypoint; and outputting the estimated time of arrival for the selected route.

2. The system of claim 1, wherein each element of the historical route information is associated with a coefficient indicative of an age of the element of the historical route information, wherein the element of the historical route information is weighed using the coefficient.

3. The system of claim 1, wherein the adjustment factor is based on at least one of a time of day for servicing the selected route, the day for servicing the selected route, a road condition along the selected route, traffic data, weather data, or local events data.

4. The system of claim 1, wherein the adjustment factor is determined based on the historical route information to add or subtract from the time duration for each waypoint.

5. The system of claim 1, wherein the time duration is a baseline time duration which is obtained from the historical route information.

6. The system of claim 1, wherein the instructions, when executed by the processor, cause the processor to perform steps further comprising:

receiving a routing update from a vehicle servicing the selected route, wherein the routing update includes a new waypoint that was not a part of the selected route;

updating a route selection algorithm based on the routing update; and determining a new estimated time of arrival based on the waypoints identified in the routing update.

7. The system of claim 1, wherein the instructions, when executed by the processor, cause the processor to perform steps further comprising:

training a machine learning algorithm based on the plurality of routes followed by one or more vehicles assigned to travel between the starting location and the destination in one or more past instances; and implementing the machine learning algorithm to identify the selected route among the plurality of routes for a current instance to travel between the starting location and the destination.

8. The system of claim 7, wherein each route is formed of a plurality of waypoints, wherein the instructions, when executed by the processor, cause the processor to perform steps further comprising:

calculating, using the machine learning algorithm, a probability for each route among the plurality of routes, wherein the probability represents a likelihood that the route will be followed by a vehicle based on the historical route information, calculating the probability for each route further comprising:

calculating a probability at each waypoint, and aggregating probabilities of the plurality of waypoints forming the route; and selecting the route with highest probability as the selected route.

9. The system of claim 8, wherein calculating the probability for each route further comprises:

for each waypoint along the route, determining a ratio of datapoints in the historical route information where the waypoint was connected to a subsequent waypoint along the route by a total count of all available datapoints where the waypoint was connected to a subsequent waypoint along all routes incorporating the waypoint.

10. The system of claim 1, wherein identifying the time duration at the waypoint associated with the starting location is adjusted in view of an embarkation data determined based on historical route information to account for time spent on a passenger boarding a vehicle, wherein identifying the time duration at the waypoint associated with the destination is adjusted in view of a disembarkation data determined based on historical route information to account for time spent on one or more passengers exiting the vehicle.

11. A method, comprising:

identifying, by a server computer, a plurality of routes connecting a start location and a destination among historical route information collected over a period of time from one or more vehicles, wherein the plurality of routes are traveled by the one or more vehicles and reported to the server computer during the period of time to get from the start location to the destination;

determining, by the server computer, an estimated time of arrival associated with a selected route among the plurality of routes, wherein the selected route includes a plurality of waypoints, determining comprising:

identifying a time duration for each waypoint;

determining an adjustment factor for at least one waypoint based on the historical route information, wherein the historical route information is weighted in accordance with a dynamic temporal weighting as a function of an age of the historical route information;

determining an augmented time duration based on the adjustment factor and the time duration associated with the at least one waypoint;

determining the estimated time of arrival based on at least the time duration for each waypoint and the augmented time duration for the at least one waypoint; and outputting, by the server computer, the estimated time of arrival for the selected route.

12. The method of claim 11, wherein the adjustment factor is based on at least one of a time of day for servicing the selected route, the day for servicing the selected route, a road condition along the selected route, traffic data, weather data, or local events data.

13. The method of claim 11, wherein the adjustment factor is determined based on the historical route information to add or subtract from the time duration for each waypoint, wherein the time duration is a baseline time duration which is obtained from the historical route information.

14. The method of claim 11, further comprising:

receiving a routing update from a vehicle servicing the selected route, wherein the routing update includes a new waypoint that was not a part of the selected route;

updating a route selection algorithm based on the routing update; and determining a new estimated time of arrival based on the waypoints identified in the routing update.

15. The method of claim 11, further comprising:

training a machine learning algorithm based on the plurality of routes followed by one or more vehicles assigned to travel between the starting location and the destination in one or more past instances; and implementing the machine learning algorithm to identify the selected route among the plurality of routes for a current instance to travel between the starting location and the destination.

16. The method of claim 15, wherein each route is formed of a plurality of waypoints, the method further comprising:

calculating, using the machine learning algorithm, a probability for each route among the plurality of routes, wherein the probability represents a likelihood that the route will be followed by a vehicle based on the historical route information, calculating the probability for each route further comprising:

calculating a probability at each waypoint, and aggregating probabilities of the plurality of waypoints forming the route; and selecting the route with highest probability as the selected route.

17. The method of claim 16, wherein calculating the probability for each route further comprises:

for each waypoint along the route, determining a ratio of datapoints in the historical route information where the waypoint was connected to a subsequent waypoint along the route by a total count of all available datapoints where the waypoint was connected to a subsequent waypoint along all routes incorporating the waypoint.

18. The method of claim 11, wherein identifying the time duration at the waypoint associated with the starting location is adjusted in view of an embarkation data determined based on historical route information to account for time spent on a passenger boarding a vehicle, wherein identifying the time duration at the waypoint associated with the destination is adjusted in view of a disembarkation data determined based on historical route information to account for time spent on one or more passengers exiting the vehicle.

19. A non-transitory computer-readable medium storing instructions that, when executed on a server computer, cause the server computer to perform steps comprising:

identifying a plurality of routes connecting a start location and a destination among historical route information collected over a period of time from one or more vehicles, wherein the plurality of routes are traveled by the one or more vehicles and reported to the server computer during the period of time to get from the start location to the destination;

determining an estimated time of arrival associated with a selected route among the plurality of routes, wherein the selected route includes a plurality of waypoints, determining comprising:

identifying a time duration for each waypoint;

determining an adjustment factor for at least one waypoint based on the historical route information, wherein the historical route information is weighted in accordance with a dynamic temporal weighting as a function of an age of the historical route information;

determining an augmented time duration based on the adjustment factor and the time duration associated with the at least one waypoint;

determining the estimated time of arrival based on at least the time duration for each waypoint and the augmented time duration for the at least one waypoint; and outputting the estimated time of arrival for the selected route.

20. The non-transitory computer-readable medium of claim 19, wherein the instructions, when executed on the server computer, further cause the server computer to perform steps comprising:

receiving a routing update from a vehicle servicing the selected route, wherein the routing update includes a new waypoint that was not a part of the selected route;

updating a route selection algorithm based on the routing update; and determining a new estimated time of arrival based on the waypoints identified in the routing update.

* * * * *